United States Patent
Uno

(10) Patent No.: US 7,049,944 B2
(45) Date of Patent: May 23, 2006

(54) BICYCLE DISPLAY WITH CHANGING COLOR ATTRIBUTES

(75) Inventor: Kouji Uno, Osaka (JP)

(73) Assignee: Shimano, Inc., Sakai (JP)

( * ) Notice: Subject to any disclaimer, the term of this patent is extended or adjusted under 35 U.S.C. 154(b) by 400 days.

(21) Appl. No.: 10/369,431

(22) Filed: Feb. 18, 2003

(65) Prior Publication Data

US 2003/0160686 A1 Aug. 28, 2003

(30) Foreign Application Priority Data

Feb. 27, 2002 (JP) ........................ 2002-052098

(51) Int. Cl.
*B62J 6/00* (2006.01)

(52) U.S. Cl. .................. 340/432; 340/525; 340/461; 340/462; 340/691.6; 340/815.45; 340/815.65; 362/473

(58) Field of Classification Search ........... 340/432, 340/525, 461, 462, 691.6, 815.45, 815.73, 340/815.65, 815.47; 345/71, 581, 690, 698, 345/214, 960; 362/23, 27, 473; 368/10
See application file for complete search history.

(56) References Cited

U.S. PATENT DOCUMENTS 4,862,395 A * 8/1989 Fey et al. ............... 702/146

| | | | |
|---|---|---|---|
| 5,373,308 A | * 12/1994 | Kurisu et al. ........... 345/35 |
| 5,629,668 A | 5/1997 | Downs | |
| 5,676,021 A | 10/1997 | Campagnolo | |
| 6,084,506 A | 7/2000 | Irie | |
| 6,204,752 B1 | 3/2001 | Kishimoto | |

FOREIGN PATENT DOCUMENTS

| JP | 57-72479 | | 10/1982 |
|---|---|---|---|
| JP | 7-76291 | A | 3/1995 |
| JP | 9-5120 | A | 1/1997 |
| JP | 10-175579 | A | 6/1998 |
| JP | 2001-126775 | A | 5/2001 |
| JP | 2001-187593 | A | 7/2001 |
| JP | 2001-281001 | A | 10/2001 |

\* cited by examiner

*Primary Examiner*—Donnie L. Crosland
(74) *Attorney, Agent, or Firm*—James A. Deland

(57) ABSTRACT

A bicycle display apparatus comprises a display unit and a color changing mechanism. The display unit optically displays information corresponding to the characteristic of the bicycling environment, and it includes a background light or a photoemission element that facilitates easy viewing of the displayed information. The color attribute changing mechanism changes at least one of the color, hue, color saturation and brightness of the background light in accordance with the characteristic of the bicycling environment.

33 Claims, 9 Drawing Sheets

LED DRIVE TIMING
EXAMPLE

BICYCLE DISPLAY WITH CHANGING COLOR ATTRIBUTES

BACKGROUND OF THE INVENTION

The present invention is directed to bicycles and, more particularly, to various features of a bicycle display apparatus that displays various characteristics of a bicycling environment.

Bicycle computers, often termed cycle computer, ordinarily includes a display that typically displays information regarding the bicycle's state of motion, such as bicycle speed or crank rotation speed (cadence). In order to display such information, the display often includes light-emitting elements such as light-emitting diodes (LED's) and/or a backlit liquid crystal display elements. Turning ON the power switch or some other switch activates the LED's and/or the backlit crystal display elements.

In recent years, there has been a rising demand for an increase in the amount of information that can be displayed on a typical bicycle computer. For example, it has been desired to display, in addition to speed and cadence information, information on the state of motion of the bicycle, such as the total distance traveled, information on the state of the bicycle itself, such as the current transmission gear position, and information related to the bicycling environment, such as the time of day. In the case of LED's, displaying such information requires an increase in the number of LED's and assigning particular meanings to the areas illuminated. Similarly, in the case of a liquid crystal display device, displaying such information requires an increase in the amount of light permeable and non-light permeable areas and assigning particular meanings to the added areas. In either case, information on the display is displayed by alternating between two display states, i.e., the ON and OFF states of the individual elements of the LED's or the light-permeable and non-light-permeable elements of liquid crystal displays, thus complicating construction.

Where a large amount of information is to be displayed, the problem exists that the display cannot handle a sufficient amount of information, thus making the display uninteresting or making the information difficult to intuitively understand. Moreover, since the area of the display for a bicycle is limited by such factors as the capacity of the power supply and the size of the display, the information displayed becomes small and even more difficult to intuitively understand when a large amount of information is to be displayed in such a limited area

SUMMARY OF THE INVENTION

The present invention is directed to inventive features of a bicycle display apparatus. In one embodiment, a bicycle display apparatus comprises a display unit and a color changing mechanism. The display unit optically displays information corresponding to the characteristic of the bicycling environment, and it includes a background light that facilitates easy viewing of the displayed information. The color attribute changing mechanism changes at least one of the color, hue, color saturation and brightness of the background light in accordance with the characteristic of the bicycling environment.

In another embodiment, a bicycle display apparatus comprises a display unit and a color changing mechanism. The display unit optically displays information corresponding to the characteristic of the bicycling environment, and it includes at least one photoemission element that displays the desired information. The color attribute changing mechanism changes at least one of the color, hue, color saturation and brightness of the at least one photoemission element in accordance with the characteristic of the bicycling environment.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
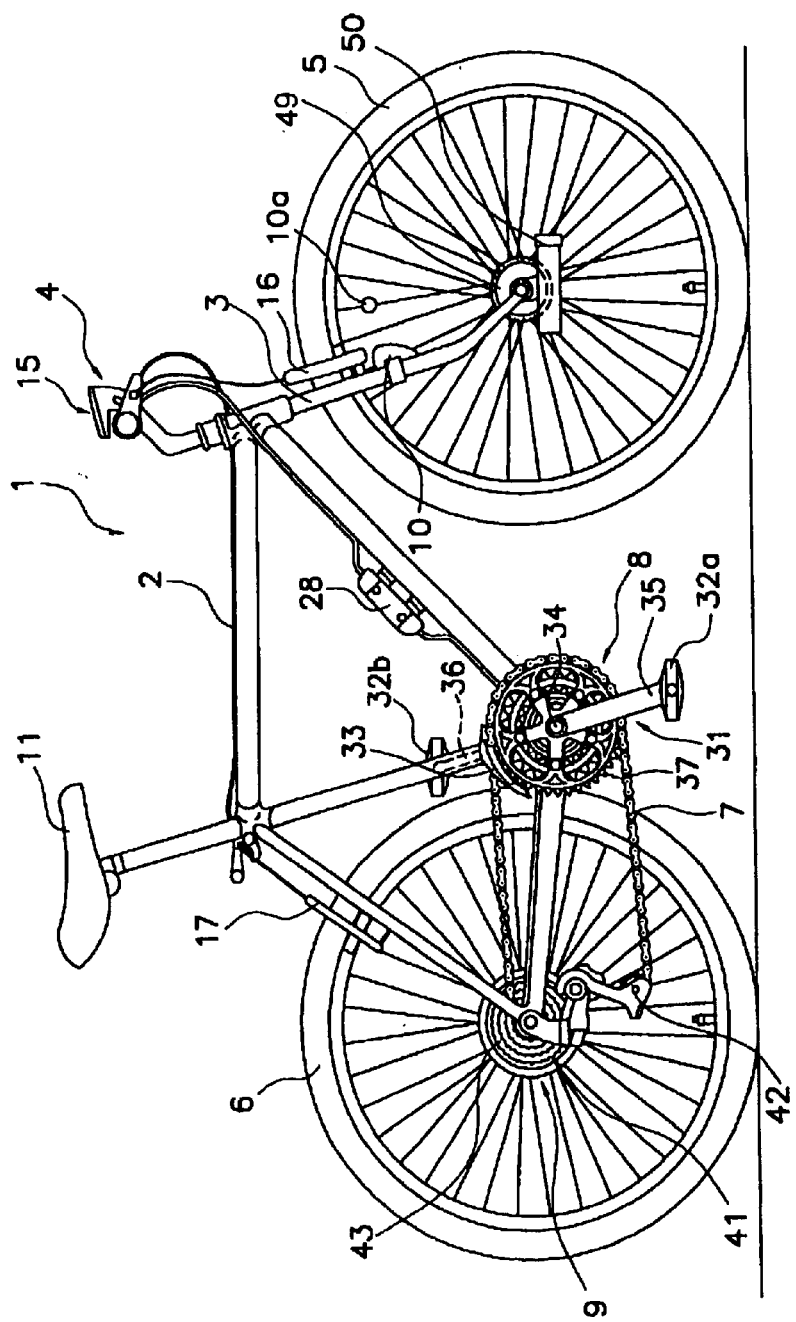
FIG. 1 is a side view of a bicycle that includes a particular embodiment of a display apparatus.
Figure 2:
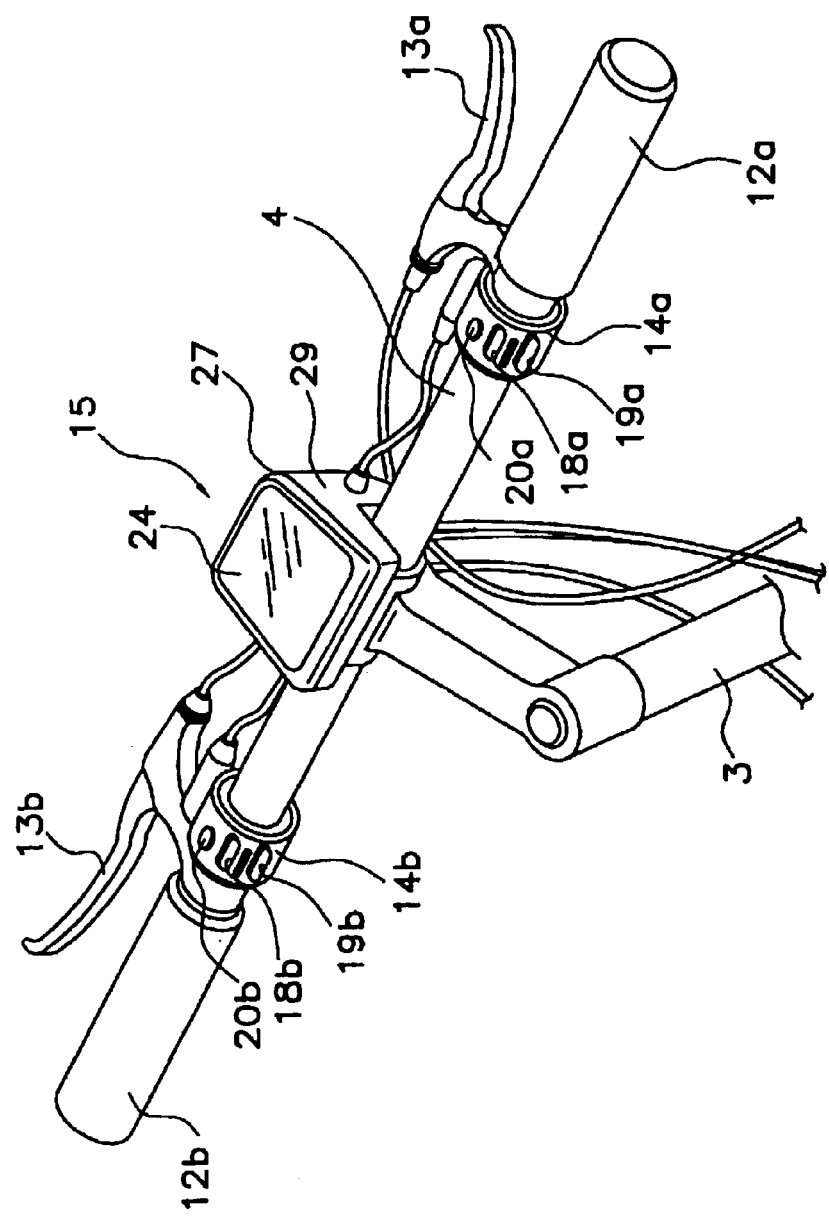
FIG. 2 is a detailed view of particular embodiments of handlebar mounted components of the bicycle shown in FIG. 1.

FIG. 1 is a side view of a bicycle that includes a particular embodiment of a bicycle display. The bicycle 1 is a sport bicycle of a mountain bike type, and it comprises a frame 2, a front fork 3 rotatably mounted to frame 2 in a slanted manner, a handlebar assembly 4 mounted to the upper part of fork 3, a front wheel 5 rotatably attached to the lower part of fork 3, a rear wheel 6 rotatably attached to the rear of frame 2, a chain 7, a front external gear shift transmission 8, a rear external gear shift transmission 9, and a saddle 11 on which the rider sits. A front wheel brake 16 is provided for braking the front wheel 5, and a rear wheel brake 17 is provided for braking the rear wheel 6. As shown in FIG. 2, respective grips 12a, 12b and brake levers 13a, 13b are provided on both ends of handlebar assembly 4. Brake lever 13b is connected to the front wheel brake 16 for braking front wheel 5, and brake lever 13a is connected to the rear wheel brake 17 for braking rear wheel 6.

The front external gear shift transmission 8 is a mechanical unit attached in the central lower part of frame 2 for transmitting the drive force generated by the rider to the rear external gear shift transmission 9 via the chain 7. In this embodiment, the front external gear shift transmission 8 comprises three sprockets 37 of various sizes, and a front derailleur 33. The three sprockets 37 are installed on a gear crank 31 that is rotated when the rider pushes pedals 32a and 32b. The gear crank 31 comprises a crankshaft 34 that passes horizontally and rotatably through the central lower part of frame 2, a right crank 35, and a left crank 36. One end of the right crank 35 is nonrotatably connected to the right side of crankshaft 34, and the three sprockets 37 are nonrotatably attached to the right crank 35. One end of the left crank 36 is nonrotatably connected to the left side of crankshaft 34. The other ends of right crank 35 and left crank 36 rotatably support pedals 32a and 32b, respectively. The front derailleur 33 engages the chain 7 with one of the three sprockets 37 and can be moved by a motor, solenoid, or some other actuator (not shown in the figures) that is controlled by a control apparatus 15 described below. A front derailleur position sensor (not shown in the figures) detects the position of front derailleur 33, and hence the current gear of front transmission 8.

The rear external gear shift transmission 9 serves to transmit the driving force transmitted by the chain 7 to the rear wheel 6. The rear external gear shift transmission 9 comprises a rear sprocket wheel 41 and a rear derailleur 42. In this embodiment, rear sprocket wheel 41 comprises seven sprockets 43 of different sizes that are mounted concentrically with the hub portion of rear wheel 6. Rear derailleur 42 engages chain 7 with one of the seven sprockets 43 and can be moved by a motor, solenoid, or some other actuator (not shown in the figures) that is controlled by a control apparatus 15. A rear derailleur position sensor (not shown in the figures) detects the position of rear derailleur 42 and hence the current gear of rear external gear shift transmission 9.

As shown in FIG. 2, shift command units 14a, 14b are provided on alternate sides of handlebar assembly 4 inwardly of grips 12a, 12b and brake levers 13a, 13b, respectively. A control apparatus 15, described below, is attached to the central portion of handlebar assembly 4, and it is operatively connected to the shift command units 14a, 14b. A generator hub 49 that forms a part of the front wheel 5 provides operating power to a lamp 50 mounted to frame 2 as well as speed signals to control apparatus 15.

The shift command units 14a, 14b are used primarily for manually shifting the front external gear shift transmission 8 and the rear external gear shift transmission 9. A front upshift button 18a and a front downshift button 19a are provided in the shift command unit 14a, and a rear upshift button 18b and a rear downshift button 19b are provided in the shift command unit 14b. In this embodiment, the upshift buttons 18a and 18b provide signals for upshifting the front and rear external gear shift transmissions 8 and 9 by one speed step. Similarly, the downshift buttons 19a and 19b provide signals for downshifting the front and rear external gear shift transmissions 8 and 9 by one speed step.

Right and left mode buttons 20a and 20b are disposed on the shift command units 14a and 14b, respectively. The mode buttons 20a and 20b are used to alternate the display on the display unit 24 of the control apparatus 15 and to input default values, for example. By operating these mode buttons 20a and 20b, the rider can operate the display unit 24 without removing his or her hands from the riding positions on the handlebar assembly 4.

Figure 3:
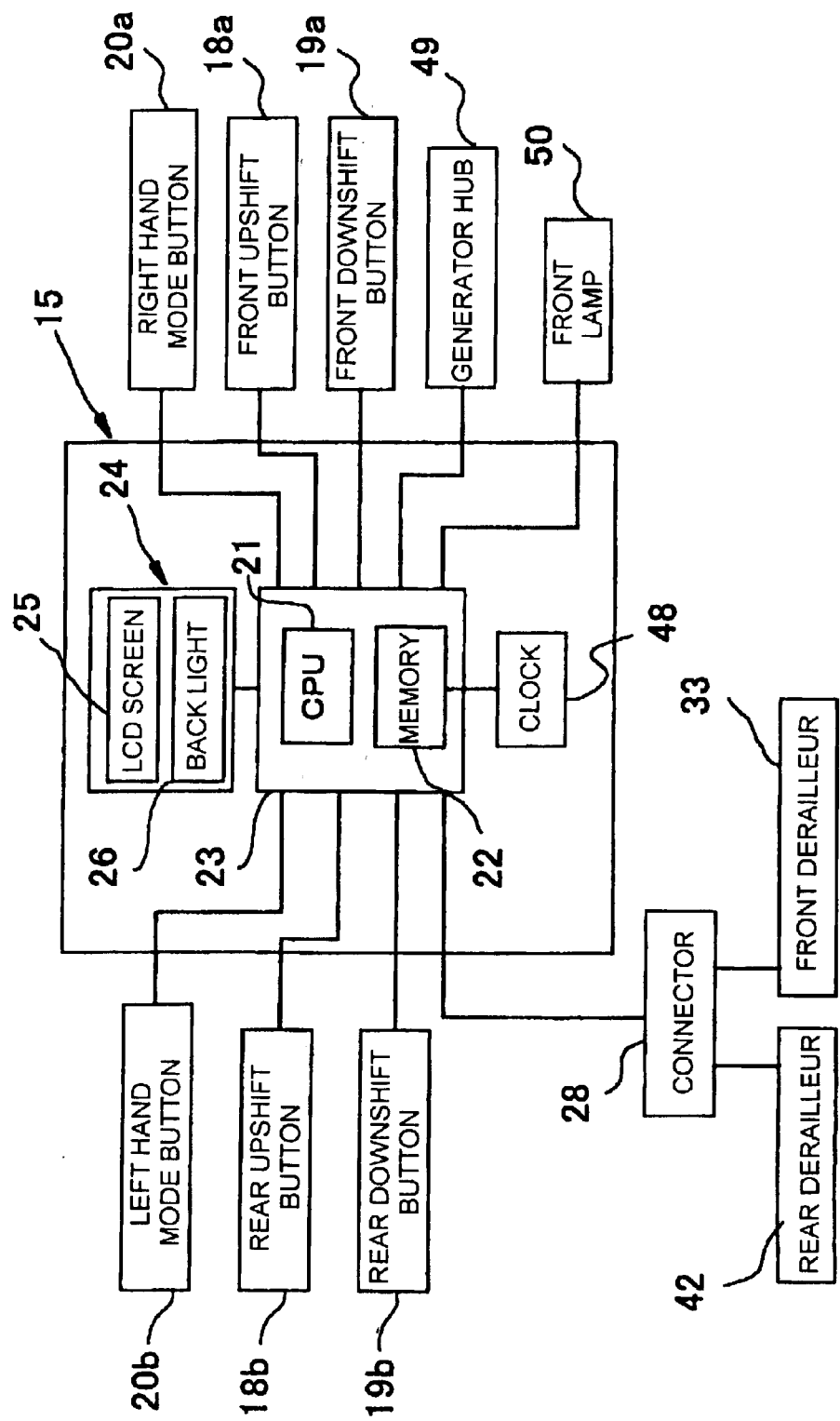
FIG. 3 is a block diagram of a particular embodiment of electrical components used with the display.

As shown in FIG. 3, the control apparatus 15 includes a controller 23 comprising a CPU 21 and a memory 22, a display unit 24 that has a liquid crystal display screen 25 that uses the segment method and displays various types of information such as the current gear, the bicycle speed and so on, a backlight 26 that illuminates the liquid crystal display screen 25 from the rear surface thereof, and a clock 48. The controller 23 controls the control apparatus 15 via the CPU 21 in accordance with the contents of the memory 22. The upshift and downshift buttons 18a, 18b, 19a and 19b, the right-hand and left-hand mode buttons 20a and 20b, the front lamp 50 and the generator hub 49 also are connected to the controller 23. An illuminance sensor (not shown) is disposed on the front lamp 50, and the front lamp 50 turns ON and OFF in accordance with the illuminance level of the surrounding environment. The illuminance signals from the illuminance sensor are also sent to the controller 23. The generator hub 49 sends wheel rotation signals to the controller 23 as noted above, and the clock 48 has a calendar function and can generate date and time data. Control apparatus 15 is connected to the actuators for front derailleur 33 and rear derailleur 42 via a connector 28, and it performs gear shift control for both mechanisms. In the case of manual gear shift mode, such control is executed in response to the manual operation of shift command units 14a and 14b.

Figure 4:
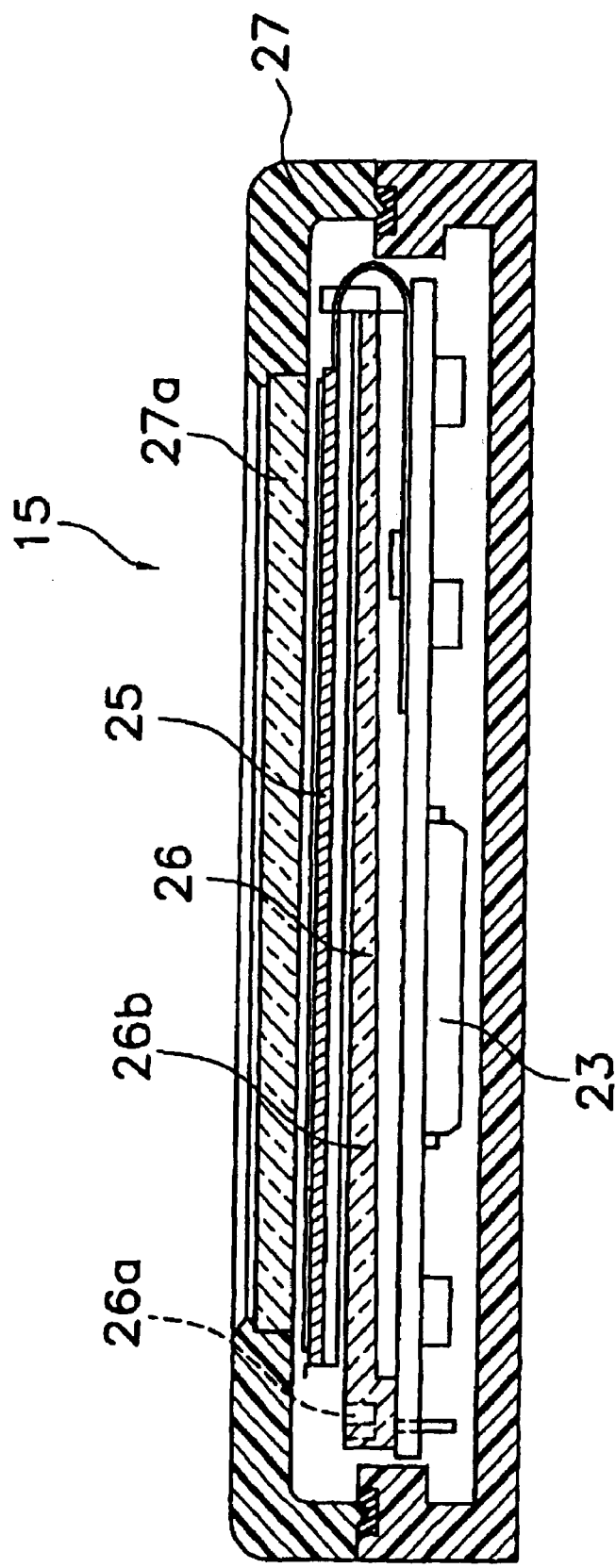
FIG. 4 is a cross sectional view of a case surrounding a control apparatus.

The control apparatus 15 is disposed in a box-shaped control case 27, and the display unit 24 is disposed on the top surface thereof. The case 27 is detachably mounted to the bracket 29 that is mounted to the handlebar assembly 4 of the bicycle 1. A display window 27a made of clear synthetic resin is disposed on the surface of the case 27, as shown in FIG. 4. The liquid crystal display screen 25 is disposed at a position facing the display window 27a. The backlight 26 is disposed on the back of the liquid crystal display screen 25. The backlight 26 has a light-emitting unit 26a composed of red, green and blue light-emitting diodes (LED's) and a light-guide plate 26b that is disposed at one end of the light-emitting unit 26a and diffuses the light output from the light-emitting unit 26a over the entire surface of the liquid crystal display screen 25. A pair of manually-operated mode buttons (not shown in the figures) having the same function as the right-hand and left-hand mode buttons 20a and 20b are disposed on the back surface of the case 27. As a result, the display unit 24 can be configured to perform various display functions even when the case 27 is detached from the bracket 29.

Control apparatus 15 measures or calculates and then displays various types of information such as the speed of the bicycle, cadence, distance traveled, lap times, the gear positions of the external gear shift mechanisms and the like, and it displays the information on the liquid crystal display screen 25 of the display unit 24. The liquid crystal display screen 25 is disposed at a position that is easy for the rider to see, such as near the central reference plane of the bicycle, i.e., in the middle of the handlebar assembly 4.

Figure 5:
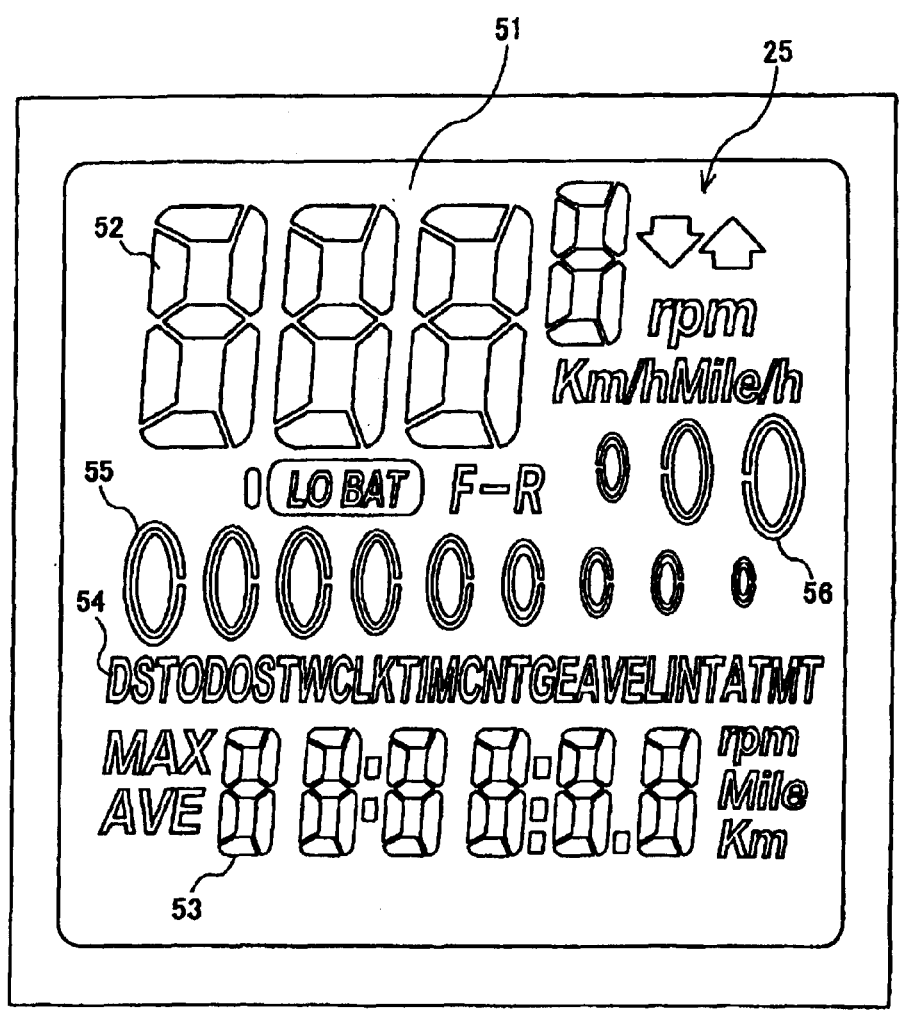
FIG. 5 is a plan view showing the display contents of an embodiment of a liquid crystal display screen.

FIG. 5 shows an embodiment of display contents of a liquid crystal display screen 25. A primary numerical display 52, a secondary numerical display 53, a contents display 54, a number of rear gears display 55 and a number of front gears display 56 are disposed on the display screen 51. Such information as the bicycle speed and time are displayed numerically in the primary numerical display 52 and the secondary numerical display 53. The contents display 54 indicates the contents displayed in the primary numerical display 52 and the secondary numerical display 53, and also displays the gear shift mode. For example, 'VEL' means the bicycle's traveling speed, 'DST' means the distance traveled or the total distance, 'CLK' means the clock, 'TIM' means the amount of time traveled, and 'GEA' means the shift position of the chain gear mechanism. In addition, 'AT' means that the current gear shift mode is automatic shift mode, while 'MT' means that the current gear shift mode is manual shift mode.

The units of speed can be switched between 'Km/h' and 'Mile/h', and the units of distance can be switched between 'Km' and 'Mile'. When the units of distance are set during initialization of the display unit 24, the units of distance thus set are used in the display on the display screen 51.

The number of rear gears display 55 displays the number of gears in the rear external gear shift mechanism 9. The number of rear gears display 55 consists of a sequence of oval display symbols aligned in decreasing order of size from left to right. These symbols are arranged so as to correspond to the effective diameters of the gears of the rear gear shift mechanism 9. During initialization of the display unit 24, the numbers of gears for the front and rear external gear shift mechanisms 8 and 9 are set on the display to match the actual numbers of gears on the bicycle. For example, if the number of rear gears is set to seven, the number of rear gears display 55 displays seven of the oval plate-shaped symbols from the left, and the rightmost two symbols are not displayed.

The number of front gears display 56 displays the number of gears of the front external gear shift mechanism 8. The number of front gears display 56 consists of a sequence of oval display symbols aligned in decreasing order of size from right to left. During initialization, if the number of front gears is set to two, the number of front gears display 56 displays two of the oval display symbols from the right, and the leftmost symbol is not displayed. Because the number of rear gears display 55 and number of front gears display 56 are arranged such that the oval display symbols correspond to the gear arrangements of the actual gear shift mechanisms 8 and 9 of the bicycle as described above, and such oval display symbols vary in size, the number of gears available can be understood intuitively at a glance.

Figure 6:
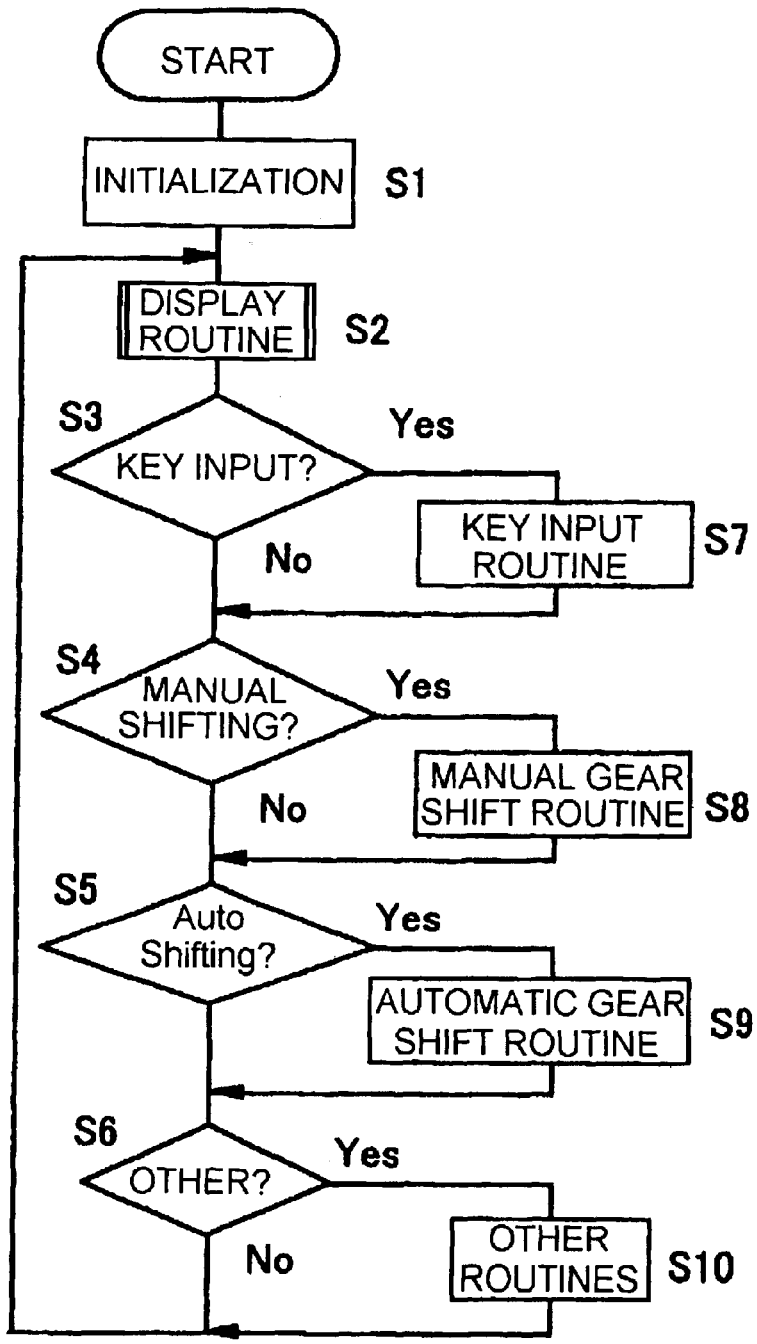
FIG. 6 is a flow chart showing a particular embodiment of a main routine executed by the control apparatus.
Figure 7:
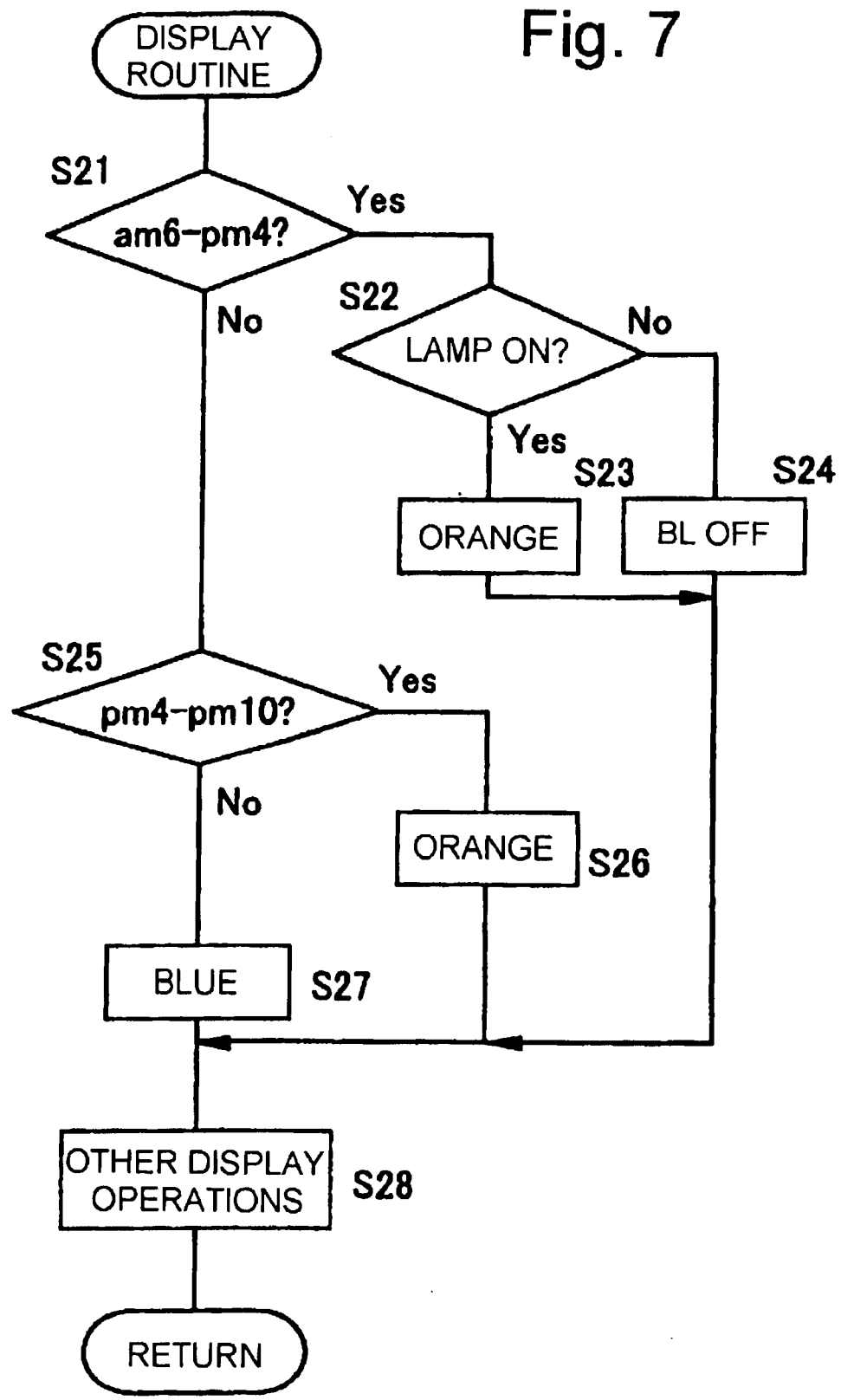
FIG. 7 is a flow chart showing a particular embodiment of a control routine executed by the control apparatus.

An example of the display control executed by the controller 23 will now be described with reference to the control flow chart shown in FIGS. 6 and 7. When power supply is begun through the installation of a battery or the like in the control apparatus 15, initialization is performed in step S1. In this example, the gear shift controller 15 is set such that the primary numerical display 52 and the secondary numerical display 53 display the bicycle speed and the current time, respectively, during initialization. In step S2, the display routine described below with reference to FIG. 7 is executed. In step S3, it is determined whether or not key input using the right-hand and left-hand mode buttons 20a and 20b has been carried out. In step S4, it is determined whether or not manual gear shift mode has been selected. In step S5, it is determined whether or not automatic gear shift mode has been selected. In step S6, it is determined whether or not a different instruction has been input. If the determination in step S6 is 'No', the controller 23 returns to step S2.

If it is determined in step S21 that the current time is between 6 a.m. and 4 p.m. If it is determined that the current time falls within that range, i.e., that it is daytime, then the controller 23 proceeds to step S22. In step S22, it is determined from the output from the illuminance sensor mounted to the front lamp 50 whether or not the front lamp 50 is ON. If the lamp 50 is already ON, the controller 23 proceeds to step S23 and the backlight 26 is set to orange. Specifically, the red and green LED's are set to ON. If the lamp is not ON, the backlight 26 is set to OFF. Accordingly, wasteful power consumption during the daytime, when the display unit 24 can be seen relatively easily, is avoided. When these operations have been completed, the controller 23 proceeds to step S28, other operations of the display routine such as speed display are executed, and the controller 23 returns to the main routine.

If the current time does not fall within the period from 6 a.m. to 4 p.m., then the controller 23 advances from step S21 to step S25. In step S25, it is determined whether or not the current time is between 4 p.m. and 10 p.m. If the current time falls within this range, then the controller 23 advances to step S26 and the backlight 26 is set to orange regardless of the ON/OFF state of lamp 50.

If the current time does not fall within the period from 4 p.m. to 10 p.m., then the controller 23 advances from step S25 to step S27. In step S27, the backlight 26 is set to blue regardless of the ON/OFF state of the lamp. The illumination color is thus changed at night, whereupon the controller 23 proceeds to step 28. In this routine, the visibility of the information can be increased by changing the color of the backlight 26, and wasteful power consumption can be avoided.

If it is determined in step S3 that key input has been made, then the controller 23 advances to step S7 and the key input routine is executed. In the key input routine, by repeatedly pressing the left-hand mode button 20b, the rider can instruct the primary numerical display 52 to display in sequence the distance traveled, the shift position number (i.e., the gear number), the maximum speed, the average speed, and other information.

When the left-hand mode button 20b and the right-hand mode button 20a are pressed simultaneously, the contents display 54 displays 'INT', and the default value input mode is entered. In the default value input mode, the distance and speed units can be alternated between 'Km' and 'Mile', and settings for the tire outer circumferential length, the time, the numbers of gears for the front and rear gear shift mechanisms and the like can be input by repeatedly pressing the left-hand mode button 20b and sequentially switching among various default values. The first selection is between 'Km' and 'Mile', and because the default units of 'Km/h' and 'Km' are flashing, the units to be used are set by causing them to flash using the right-hand mode button 20a and entering them by pressing the left-hand mode button 20b. The rider then moves onto the next setting procedure.

Tire outer circumferential length setting is then performed, but the setting procedure will not be explained in detail here. When tire outer circumferential length setting is completed, the time is set. The time is displayed on the secondary numerical display 53, and is set by switching the value to be set to seconds, minutes and finally hours using the left-hand mode button 20b and entering the desired value with the right-hand mode button 20a. When the left-hand mode button 20a is pressed after all setting is completed, time setting is ended, and setting of the numbers of gears for the front and rear external gear shift mechanisms 8 and 9 is then performed.

During setting of the numbers of gears for the front and rear external gear shift mechanisms 8 and 9, first, because the entire number of rear gears display 55 is flashing, the right-hand mode button 20a is pressed several times to cause the number of oval symbols that matches the number of gears on the bicycle to be illuminated. When setting is completed, the left-hand mode button 20b is pressed and setting of the number of gears for the number of front gears display 56 is performed. The setting method is the same as that used for the number of rear gears display 55. The set numbers of gears are stored in the memory 22, and the data regarding the numbers of gears is maintained until the default values are set once more.

When all initial settings have been entered, the right-hand mode button 20a and the left-hand mode button 20b are pressed simultaneously once more and the display apparatus 15 enters normal mode. If the right-hand mode button 20a and the left-hand mode button 20b are pressed simultaneously for three seconds or longer, the liquid crystal display 25 is initialized, and the CPU 21 can be reset as well.

By pressing the right-hand mode button 20b for three seconds or longer, the gear shift mode can be switched between automatic mode and manual mode. When manual mode is selected, 'MT' is displayed in the contents display 54, while 'AT' is displayed if automatic mode is selected.

With regard to the external gear shift mechanisms 8 and 9, the relative sizes of the oval symbols in the graphic display in the number of rear gears display 55 and number of front gears display 56 may be arranged so as to correspond to the effective diameters of the gears, as described above, but where the bicycle is using internal gear shift mechanisms, the relative sizes of the oval symbols of the graphic display in the number of rear gears display 55 and the number of front gears display 56 may be arranged so as to correspond to the speed ratios (the speed increase ratio or speed decrease ratio) of the internal gears. Thus, the effect that is achieved with an external gear shift mechanism will be achieved in the case of an internal gear shift mechanism as well.

While the above is a description of various embodiments of inventive features, further modifications may be employed without departing from the spirit and scope of the present invention. For example, in the above embodiment, LED's were used as the light source for the backlight, but other electroluminescent elements may be used as well.

Figure 8:
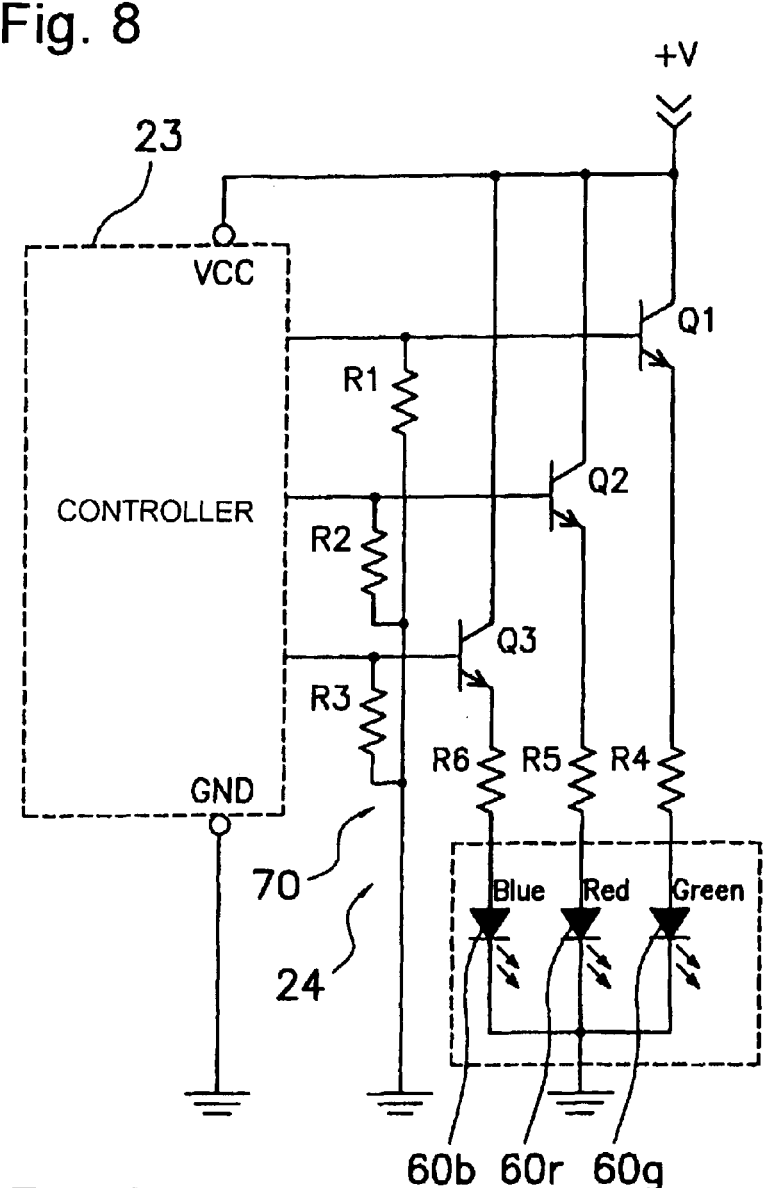
FIG. 8 is a circuit diagram showing a particular embodiment of an LED drive circuit of a second embodiment of a display.
Figure 9:
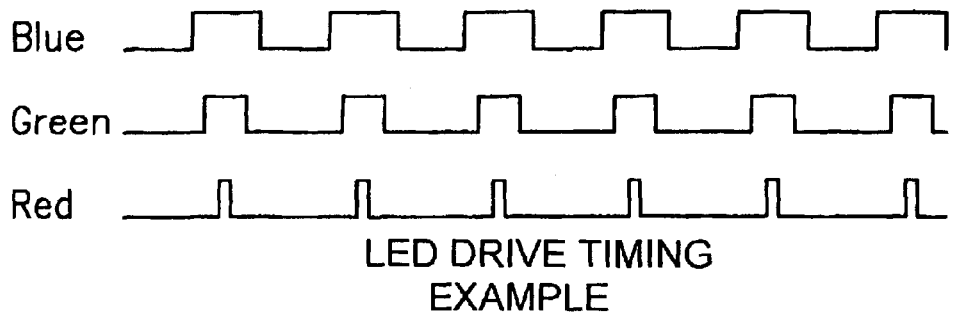
FIG. 9 is a timing chart showing a particular embodiment of drive timing of the LED's shown in FIG. 8.
Figure 10:
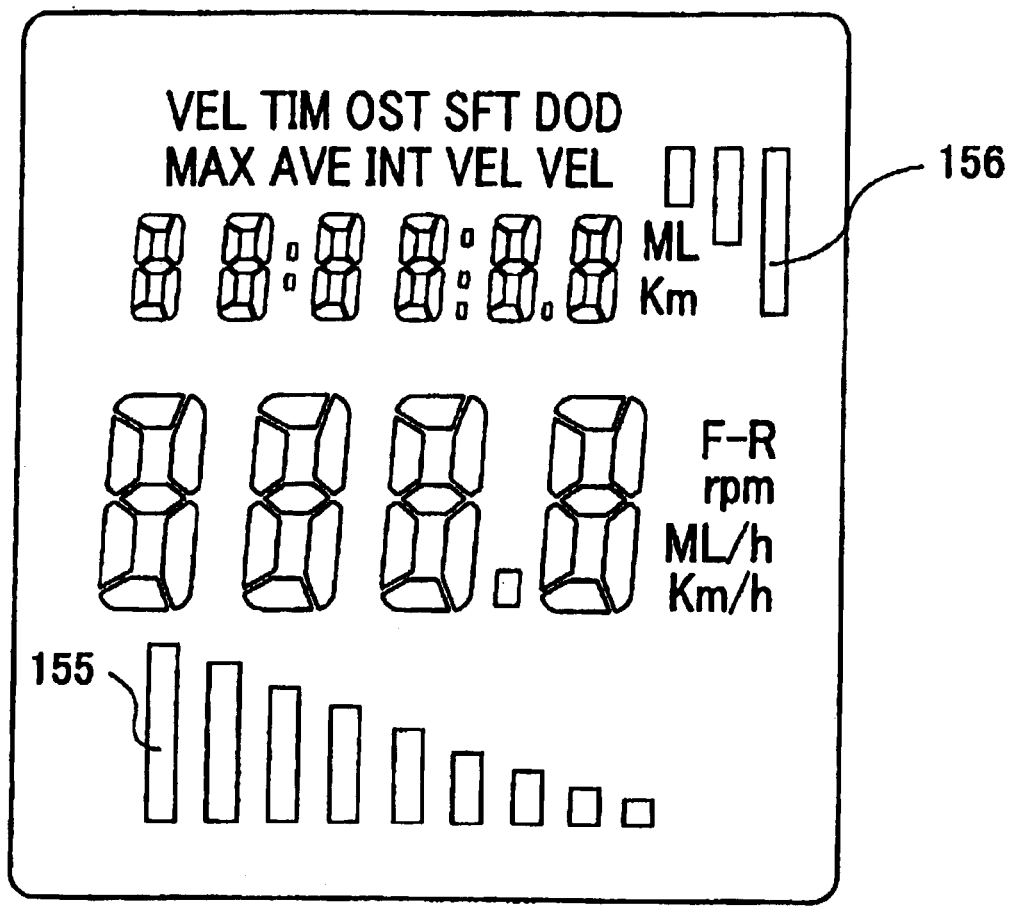
FIG. 10 is a plan view of the display contents of the second embodiment.

In the above embodiment, a liquid crystal display screen 25 was used for the display unit 24, but a light-emitting surface composed of LED's or other electroluminescent elements may be used as shown in FIG. 8. For example, where red, blue and green LED's 60r, 60b and 60g are used, the drive circuit 70 that drives the LED's 60r, 60b and 60g has switching elements Q1–Q3 for each color, which turn ON and OFF based on signals from the controller 23, ground resistors R1–R3 to reliably extinguish the LED's 60r, 60b and 60g, and current regulating resistors R4–R6 that are disposed between the switching elements Q1–Q3 and the LED's 60r, 60b and 60g. In this case, as shown in FIG. 9, by controlling the period during which the LED's 60r, 60b and 60g are ON, the hue, color saturation and brightness can be adjusted, enabling a full-color display to be achieved. An example of this type of display is shown in FIG. 10. In FIG. 10, the number of rear gears display 155 and the number of front gears display 156 are displayed in bar chart format. A full-color display can also be achieved if organic electroluminescent elements are used.

In the above embodiment, the segment method was used for the liquid crystal display screen, but the dot matrix or bit-mapped method may be used instead. In such a case, the various types of information become even easier to see.

In the description of the flowchart shown in FIG. 7, the color characteristics of the display from the display unit 24 were changed in accordance with the time, which constitutes a temporal state of the bicycling environment, but of course the present invention is not limited to this implementation. Information about the state of the bicycle may be used as well. Such information may include, but is not limited to, bicycle speed, the crank rotation rate (cadence), the remaining capacity in the battery comprising the power supply for the display apparatus, the ON/OFF state of the bicycle's front lamp, the amount of light emitted from the lamp, the amount of charge remaining where the power supply is charged by a generator, the average speed, the total distance traveled or the like. Information about the physical state of the bicycling environment also may be used. Such information may include, but is not limited to, the slope of the road, the ambient illuminance, atmospheric conditions (temperature, pressure, humidity), the position of the bicycle (longitude and latitude), the distance to an obstacle located in front of the rider, or the like. The characteristic of the bicycling environment also may include a status of the rider such as the rider's heart rate, blood pressure, calorie consumption, pedaling force, or the like. The inventive features include, but are not limited to, manipulation of the color characteristics of all combinations of the information generated by such data. This includes the features wherein the three color elements of the backlighting display are changed or the three color elements of the light-emitting elements of the display are changed in accordance with various types of information.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle display apparatus comprising:
   a display unit that optically displays information corresponding to a characteristic of a bicycling environment, wherein the display unit includes a background light that facilitates easy viewing of the displayed information corresponding to the characteristic of the bicycling environment; and
   a color attribute changing mechanism that changes at least one of the color, hue, color saturation and brightness of the background light in accordance with the characteristic of the bicycling environment.

2. The apparatus according to claim 1 wherein the display unit comprises a liquid crystal display device.

3. The apparatus according to claim 2 wherein the liquid crystal display device comprises segmented character display.

4. The apparatus according to claim 2 wherein the liquid crystal display device comprises a dot-matrix character display.

5. The apparatus according to claim 1 wherein the background light comprises a backlight light source.

6. The apparatus according to claim 5 wherein the backlight light source comprises an LED.

7. The apparatus according to claim 5 wherein the backlight light source comprises an electroluminescent element.

8. The apparatus according to claim 1 wherein the characteristic of the bicycling environment comprises information indicating a characteristic of the bicycle.

9. The apparatus according to claim 8 wherein the characteristic of the bicycle comprises a motion state of the bicycle.

10. The apparatus according to claim 8 wherein the characteristic of the bicycle comprises a state of a bicycle transmission.

11. The apparatus according to claim 1 wherein the characteristic of the bicycling environment comprises a physical state of the bicycling environment.

12. The apparatus according to claim 1 wherein the characteristic of the bicycling environment comprises a temporal state of the bicycling environment.

13. The apparatus according to claim 12 wherein the temporal state of the bicycling environment comprises a time of day.

14. The apparatus according to claim 1 wherein the characteristic of the bicycling environment comprises a status of a rider of the bicycle.

15. A bicycle display apparatus comprising:
- a display unit, wherein the display unit optically displays information corresponding to a characteristic of the bicycling environment, wherein the display unit includes at least one photoemission element used in displaying the information corresponding to the characteristic of the bicycling environment; and
- a first color attribute changing mechanism that changes at least one of the color, hue, color saturation and brightness of the at least one photoemission element in accordance with the characteristic of the bicycling environment.

16. The apparatus according to claim 15 wherein the at least one photoemission element comprises an LED.

17. The apparatus according to claim 16 wherein the display unit includes a background light that facilitates easy viewing of the displayed information corresponding to the characteristic of the bicycling environment.

18. The apparatus according to claim 17 further comprising a second color attribute changing mechanism that changes at least one of the color, hue, color saturation and brightness of the background light in accordance with the characteristic of the bicycling environment.

19. The apparatus according to claim 18 wherein the background light comprises an LED.

20. The apparatus according to claim 18 wherein the background light comprises an electroluminescent element.

21. The apparatus according to claim 15 wherein the at least one photoemission element comprises an electroluminescent element.

22. The apparatus according to claim 21 wherein the display unit includes a background light that facilitates easy viewing of the displayed information corresponding to the characteristic of the bicycling environment.

23. The apparatus according to claim 22 further comprising a second color attribute changing mechanism that changes at least one of the color, hue, color saturation and brightness of the background light in accordance with the characteristic of the bicycling environment.

24. The apparatus according to claim 23 wherein background light comprises an LED.

25. The apparatus according to claim 23 wherein the background light comprises an electroluminescent element.

26. The apparatus according to claim 15 wherein the characteristic of the bicycling environment comprises information indicating a characteristic of the bicycle.

27. The apparatus according to claim 26 wherein the characteristic of the bicycle comprises a motion state of the bicycle.

28. The apparatus according to claim 26 wherein the characteristic of the bicycle comprises a state of a bicycle transmission.

29. The apparatus according to claim 15 wherein the characteristic of the bicycling environment comprises a physical state of the bicycling environment.

30. The apparatus according to claim 15 wherein the characteristic of the bicycling environment comprises a temporal state of the bicycling environment.

31. The apparatus according to claim 30 wherein the temporal state of the bicycling environment comprises a time of day.

32. The apparatus according to claim 15 wherein the characteristic of the bicycling environment comprises a status of a rider of the bicycle.

33. A bicycle display apparatus comprising:
- a display unit that optically displays information corresponding to a characteristic of a bicycling environment, wherein the display unit includes a plurality of photoemission elements that displays the information corresponding to the characteristic of the bicycling environment;
- wherein the plurality of photoemission elements comprise a green photoemission element, a red photoemission element, and a blue photoemission element; and
- a color attribute changing mechanism that changes at least one of the color, hue, color saturation and brightness of at least one of the plurality of photoemission elements in accordance with the characteristic of the bicycling environment.

* * * * *